United States Patent
Liu et al.

(10) Patent No.: US 9,749,801 B2
(45) Date of Patent: Aug. 29, 2017

(54) USER ASSISTED LOCATION DEVICES

(71) Applicant: Honeywell International Inc., Morristown, NJ (US)

(72) Inventors: Haiyang Liu, Plymouth, MN (US); Soumitri N. Kolavennu, Blaine, MN (US); Steve Huseth, Plymouth, MN (US)

(73) Assignee: Honeywell International Inc., Morris Plains, NJ (US)

( * ) Notice: Subject to any disclaimer, the term of this patent is extended or adjusted under 35 U.S.C. 154(b) by 668 days.

(21) Appl. No.: 13/842,419

(22) Filed: Mar. 15, 2013

(65) Prior Publication Data

US 2014/0274163 A1  Sep. 18, 2014

(51) Int. Cl.
*H04W 24/00* (2009.01)
*H04W 4/02* (2009.01)
*G01C 21/16* (2006.01)
*G01S 19/49* (2010.01)
*G01S 5/02* (2010.01)
*G01S 19/39* (2010.01)

(52) U.S. Cl.
CPC .......... *H04W 4/025* (2013.01); *G01C 21/165* (2013.01); *G01S 5/02* (2013.01); *G01S 5/0263* (2013.01); *G01S 5/0294* (2013.01); *G01S 19/39* (2013.01); *G01S 19/49* (2013.01); *H04W 4/026* (2013.01)

(58) Field of Classification Search
CPC ......... H04W 4/22; H04W 64/00; H04W 4/02; H04W 48/04; H04L 2012/5607; H04L 80/04
USPC ..... 455/404.2, 456.1–456.6, 457; 370/310.2, 370/328
See application file for complete search history.

(56) References Cited

U.S. PATENT DOCUMENTS

| | | | |
|---|---|---|---|
| 5,717,392 A * | 2/1998 | Eldridge | 340/996 |
| 8,018,383 B1 * | 9/2011 | Schantz et al. | 342/453 |
| 2004/0124982 A1 * | 7/2004 | Kovach | 340/572.1 |
| 2010/0312469 A1 * | 12/2010 | Chen | 701/207 |
| 2013/0065604 A1 | 3/2013 | Werner | |

FOREIGN PATENT DOCUMENTS

WO    2013014649    1/2013

OTHER PUBLICATIONS

EP Search Report related to EP Application 14159002.6 dated Jun. 20, 2014 (4 pages).

* cited by examiner

*Primary Examiner* — Steve D Agosta
(74) *Attorney, Agent, or Firm* — Brooks, Cameron & Huebsch, PLLC

(57) ABSTRACT

Methods, systems, and devices are described herein. One method can include determining a cross validation model using a user input, estimating a movement of a device from a first location to a second location using the cross validation model and the user input, and determining the second location of the device using the estimated movement of the device.

20 Claims, 3 Drawing Sheets

USER ASSISTED LOCATION DEVICES

TECHNICAL FIELD

The present disclosure relates to user assisted location devices, systems, and methods for determining a location of a user assisted location device and/or system.

BACKGROUND

In many situations, it can be desirable to know a location of a person inside an environment. For instance, in an emergency situation, the knowledge of the location of an employee in an environment (e.g., building) can be useful to provide assistance to the employee and/or to assist the employee in navigating out of the environment. Equipping persons (e.g., employees, emergency responder, and/or other persons) with a location device can enhance safety and productivity (e.g., by assisting the person in navigating the environment).

Previous approaches for location devices, typically known as personal navigation devices, however, may be expensive, unreliable, and/or inaccurate at locating and/or navigating inside an environment. For instance, such devices can include an inertial measurement unit (IMU) to estimate movement of a person, a Global Positioning System (GPS) component to establish a position of the person using GPS techniques using GPS signals, and/or a wireless component to estimate a location of the person using location estimation techniques (e.g., wireless signal triangulation). However, IMU measurements can have accumulated error (e.g., drift), GPS signals may be unavailable and/or intermittent inside an environment, and wireless signal based location estimation can be inaccurate due to refraction and/or reflection caused by structure of the environment. Some previous approaches resolve such inaccuracy and/or reliability problems using expensive equipment and technology. Accordingly, previous approaches for location devices may not be accurate, reliable, and/or cost effective.

DETAILED DESCRIPTION

Figure 1:
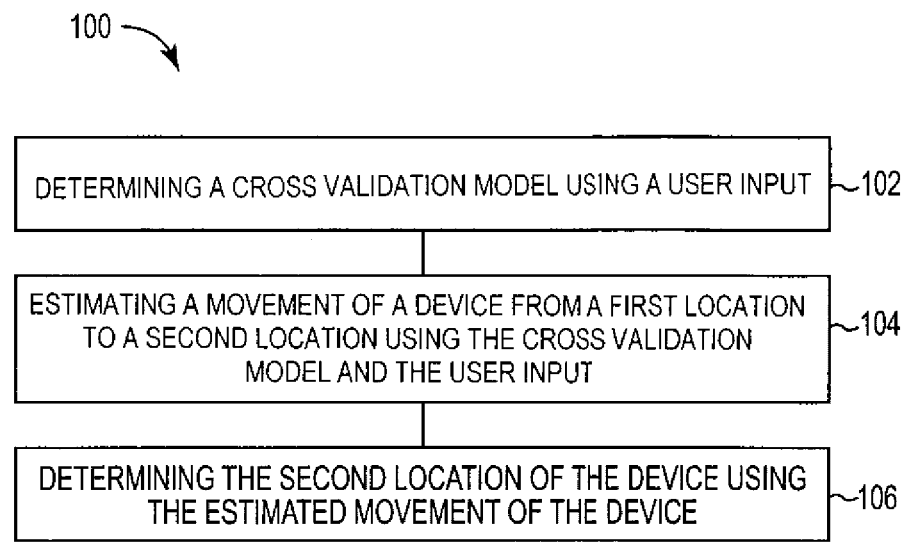
FIG. 1 illustrates a method for determining a location of a user assisted location device in accordance with one or more embodiments of the present disclosure.

Methods, systems, and devices are described herein. For example, one or more embodiments can include determining a cross validation model using a user input, estimating a movement of a device from a first location to a second location using the cross validation model and the user input, and determining the second location of the device using the estimated movement of the device.

A location device can be used to determine, transmit, and/or track the location of a person carrying the device. Such location devices and/or systems can, for instance, receive a GPS signal containing position information and/or data to establish a location of the person. However, a person may be in a location where a GPS and/or other global navigation signal is unavailable and/or unreliable. For instance, a GPS signal may be unavailable and/or unreliable if the user is located inside an environment (e.g., a building complex industrial complex, skyscraper, and/or laboratory) and/or underground. If a person wearing and/or using the device is in a location where GPS is unavailable and/or unreliable, the device may not establish an accurate location.

The unavailability and/or unreliability of GPS techniques can be mitigated using an IMU and/or wireless signal component. An IMU, as used herein, can include a component that can measure and/or report movement of a device (e.g., movement from a first location to a second location). A wireless component can receive wireless signals, which can be used to determine a location using wireless signal based location estimation (e.g., triangulation techniques). However, IMU measurements and wireless signal based location estimation can be inaccurate due to drifting of IMU measurements, and/or reflection and/or refraction of wireless signals in an environment. While some approaches have been developed to resolve the inaccuracies of GPS, IMU measurements, and wireless signal based location estimation, such approaches can be costly to develop and use. In contrast, location devices, systems, and methods, in accordance with one or more embodiments of the present disclosure may be accurate and/or reliable while remaining cost effective to produce as compared to previous approaches.

For instance, a location device (e.g., a user assisted location device) in accordance with the one or more embodiments of the present disclosure can include a combination of IMU, GPS, and wireless signal techniques. Such techniques can be used to determine a first location of a location device (e.g., a zone of a building) and to retrieve a map of the first location. The map can include constraints (e.g., movement constraints) and can be used to determine a spatial probability distribution of a second location. As a person wearing the location device moves (e.g., to a second location), a motion model can be determined using measurements from the IMU and can be revised using a cross validation model determined using GPS signals, wireless signals, the map, and/or user inputs to correct anomalies in the motion model. The revised motion model can be used to estimate the movement of the location device to the second location, and determine the second location of the location device.

These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

The figures herein follow a numbering convention in which the first digit or digits correspond to the drawing figure number and the remaining digits identify an element or component in the drawing. Similar elements or components between different figures may be identified by the use of similar digits.

As used herein, "a" or "a number of" something can refer to one or more such things. For example, "a number of objects" can refer to one or more objects. Additionally, the designator "N", as used herein, particularly with respect to reference numerals in the drawings, indicate that a number of the particular feature so designated can be included with a number of embodiments of the present disclosure.

FIG. 1 illustrates a method 100 for determining a location of a user assisted location device (herein referred to as "location device") in accordance with one or more embodiments of the present disclosure. For instance, using method 100, a location and/or movement of a user wearing the location device can be determined while the user is located inside an environment (e.g., a building complex industrial complex, skyscraper, and/or laboratory). A user, as used herein, can include a person (e.g., an employee, a first responder personnel, a government personal, and/or a child, among other persons) wearing and/or associated with the location device.

The location device, in accordance with one or more embodiments, can include a global navigation component (e.g., GPS and/or other global navigation signal component), an IMU component, and/or a wireless component. The global navigation component can, for instance, include a GPS component. The GPS component can include a component to receive and/or send GPS signals, including location and position data. A GPS signal and/or other global navigation signal can include a signal sent from a GPS satellite. A GPS can include a space-based satellite navigation system that provides location and time information (e.g., position data), where there is no unobstructed line of sight to four or more GPS satellites.

For example, a GPS component can include a GPS antenna and a GPS receiver for sending and receiving GPS signals including position data. An antenna, as used herein, can include an electrical device that can convert electric currents into radio waves, and/or vice versa. A GPS antenna for receiving a signal can include an antenna that can intercept a GPS signal to produce a voltage at its terminal that can be applied to the GPS receiver to be amplified.

An IMU component, as used herein, can include a component that can measure and/or track movement measurements, for instance. As an example, the IMU component can measure velocity, orientation, and/or gravitation forces of the location device using a combination of accelerometers, gyroscopes, and/or pressure sensors. For instance, the IMU component can measure and/or monitor acceleration and/or rotation (e.g., pitch, roll, and yaw) of the location device.

A wireless component, as used herein, can include a wireless antenna and wireless receiver for receiving and/or sending wireless signals. The wireless component can be used to send and/or receive a wireless signal to and/or from multiple different points (e.g., wireless bases). The wireless signals received can be used, for instance, to perform location estimation.

Location estimation using wireless signals can include, for instance, wireless signal triangulation. Wireless signal triangulation can include a process to determine a location of a wireless component (e.g., receiver) by measuring the radial distance and/or direction of a received wireless signal from multiple wireless bases. The distance to the device can be determined by measuring relative time delays in a wireless signal sent from the device to multiple different wireless bases.

In various embodiments, the location device can include a user-interface component. A user-interface can include hardware components and/or computer-readable instruction components for a user to interact with a computing component of the location device using audio commands, text commands, and/or images. For instance, the user-interface component can receive user inputs (e.g., as discussed further herein).

At block 102, the method 100 can include determining a cross validation model using a user input. For instance, in response to the user input, the method 100 can include searching a map of a first location (e.g., a previously determined location) based on coarse location information (e.g., a GPS signal and/or wireless signal) and/or previous location estimates to determine a location estimate (e.g., a second location).

A cross validation model, as used herein, can include a spatial probability distribution of a next location (e.g., the second location) based on a previously determined location (e.g., the first location). The cross validation model, in various embodiments, can be determined by identifying and/or revising a spatial probability distribution of a second location (e.g., next location) of the location device. A spatial probability distribution of a second location of the location device can be identified using a first signal and constraints of the first location. The first signal can include a GPS signal and/or other global navigation signal, and/or a wireless signal.

The first location, in various embodiments, can include a zone (e.g., a sub-portion) of an environment (e.g., building) and/or a previously determined location located in a zone of the environment. The spatial probability distribution can include a three-dimensional (3D) spatial probability distribution for a second location (e.g., the next location) within a period of time based on the first location. In other words, the spatial probability distribution can be a likelihood of movement of the location device to various locations.

In some instances, the cross validation model can be determined by revising the spatial probability distribution using a received second signal and/or a user input. For instance, the second signal can include a GPS signal and/or other global navigation signal, and/or a wireless signal. In various embodiments, the cross validation model can be continuously revised using available GPS signals, wireless signals, and/or user inputs (e.g., speech-based description and/or user check-ins).

A user input, as used herein, can include an input to the location device by the user wearing and/or associated with the device. The user input can be associated with movement and/or location of the user. The user input can include a speech-based description of movement and/or user check-in. A speech-based description, as used herein, can include a verbal description spoken by a user. The speech-based description can be associated with movement of the device (e.g., a spoken motion hint, a spoken direction hint, and/or a spoken lack of direction hint). Such descriptions can include a description about a type of motion (e.g., "I am walking" and/or "I am running), a direction and/or directions changes (e.g., "turned 90 degrees"), and/or a lack of direction and/or lack of direction change (e.g., "no change in direction").

A user check-in, as used herein, can include a user check-in at a check-in location. A user check-in can include a speech-based check-in and/or a scan check-in, for example. For instance, a speech-based check-in can include speech indicating the user is near a particular place and/or near a check-in location (e.g., a landmark and/or object). A scan check-in can include a scanned barcode and/or radio frequency identification (RFID) at a check-in point. For instance, the location device, in some instances, can include a user-interface and/or a scanning component capable of scanning a barcode and/or RFID.

In various embodiments, the method 100 can include determining the first location using the received first signal. Determining the first location can occur, for instance, prior to determining a second location. Thereby, the first location, as used herein, can be referred to as a previously determined location (e.g., a "fix") and/or a previous location. A fix, as used herein, can include a previously determined location. The first signal received can include a GPS signal and/or other global navigation signal and/or a wireless signal. For instance, a GPS signal, if available, can be used to determine the zone the user is likely in using position data in the zone. If a GPS signal is not available, a wireless signal can be used to determine the likely zone (e.g., using wireless location estimation techniques).

Based on the determination of the first location, a map of the first location can be retrieved. Using the map, for instance, the constraints of the first location can be determined (e.g., calculated and/or identified). Constraints of a location, as used herein, can include movement constraints. Such movement constraints can include movement limitations of the first location and/or zone of an environment the first location is in (e.g., cannot walk through walls, cannot jump through floors, distance parameters based on time elapse, etc). The constraints can be based on, for instance, a floor plan of the zone (e.g., based on the map). The constraints can be used to identify a spatial probability distribution.

At block 104, the method 100 can include estimating a movement of a device from a first location to a second location using the cross validation model and the user input. The second location, as used herein, can be referred to as a next location, a current location, and/or position along a track of movement. A next location, as used herein, can refer to a future location. For instance, the second location can be a possible future location when the location device is located at the first location. The second location can be referred to as a current location, in various instances, when the user has moved from the first location to a second location (e.g., the exact location of the second location can be determined using the method 100). A position along a track of movement, as used herein, can include a particular location along a track of movement (e.g., the user may still be moving).

At block 106, the method 100 can include determining the second location of the device using the estimated movement of the device. For instance, determining the second location can include combining absolute location estimations (e.g. using the user input) with the cross-validation model to form absolute current positions estimations (e.g., as discussed further herein). The absolute current position estimations can include reference point updates.

In some embodiments, the cross-validation model can be dynamically revised based on received GPS signals, wireless signals, and user inputs to estimate reference point updates. The reference point updates can be combined with the estimated movement to determine a fusion model and to identify the second location of the device. The second location can, for instance, be displayed on a user-interface. For instance, the display can include a 3D location estimation.

In accordance with various embodiments of the present disclosure, the method 100 can include determining a motion model using measurements from an IMU component to determine the second location. A motion model, as used herein, can include a model of movement of the location device. For instance, measurements from the IMU component can include measurements from an accelerometer subcomponent, a gyroscope (e.g., magnetometer) subcomponent, and/or a pressure sensor subcomponent.

The measurements from the IMU component can be used to estimate movement of the location device using dead reckoning principles (e.g., as discussed further herein). The movement estimated using the IMU component can include, for instance, distance, orientation, and height change. The movement can be estimated using dead reckoning principles (e.g., as discussed further herein). The motion model determined can be, for instance, revised using the cross validation model to filter anomalies (e.g., as discussed further herein). That is, the cross validation model can be used to statistically validate the accuracy of the motion model. An estimated movement of the location device can be determined, in some instances, using the revised motion model.

Figure 2:
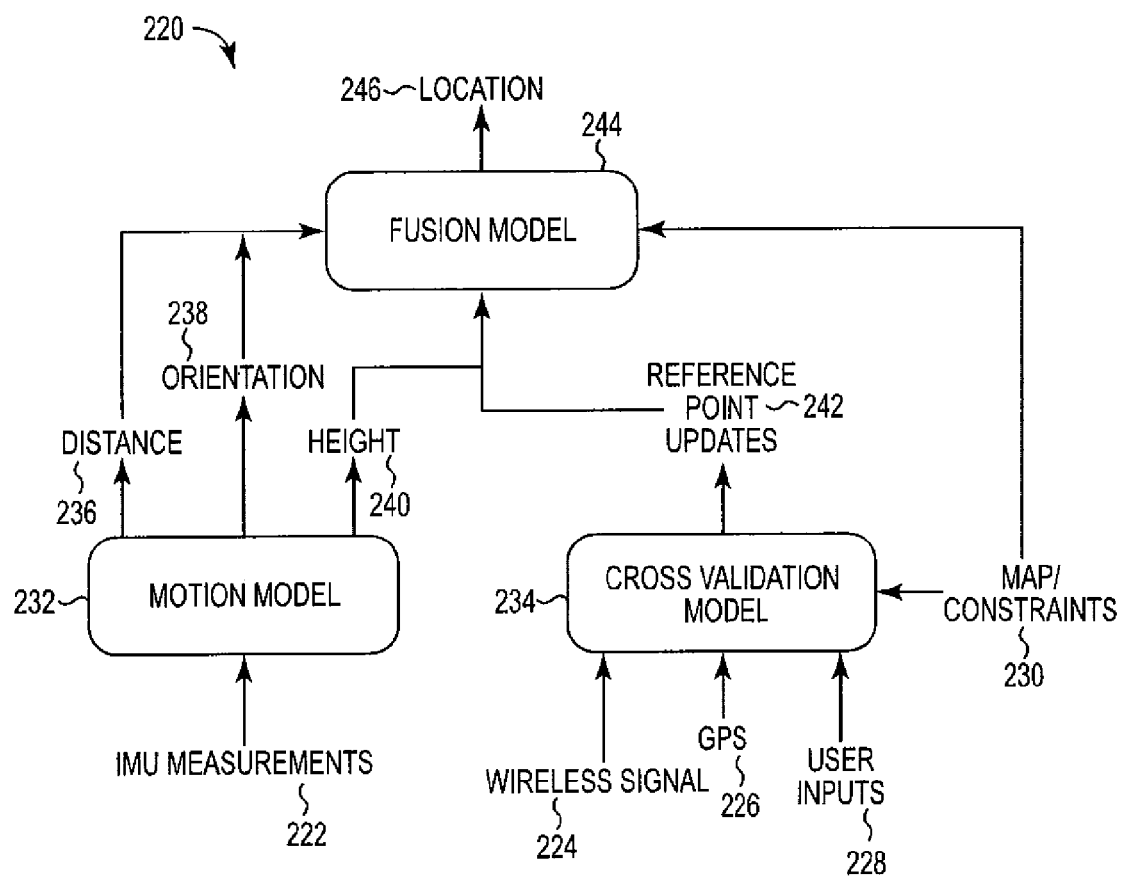
FIG. 2 illustrates a block diagram of an example of a process for determining a location of a user assisted location device in accordance with one or more embodiments of the present disclosure.

FIG. 2 illustrates a block diagram of an example of a process 220 for determining a location of a location device in accordance with one or more embodiments of the present disclosure.

Determining the location 246 of a location device can include inputting, receiving, and/or measuring a variety of inputs to determine one or more models associated with a second location (e.g., the current and/or next location) of the location device. The models can include a motion model 232 describing motion of the location device from a first location to a second location, a cross validation model 234 describing the spatial probability distribution of the second location (e.g., the likely distribution of the next location), and a fusion model 244 that describes the combination of the output of the motion model 232 and cross validation model 234.

The cross validation model 234 can be determined by revising a spatial probability distribution using a received second signal and a user input. A spatial probability distribution, in some embodiments, can be determined using location context. For instance, constraints of a zone in an environment the location device is in can be determined using a map of the zone (e.g., map/constraints 230). The zone can be, for instance, associated with the first location (e.g., can be the first location and/or the first location be in the zone).

In some embodiments, the zone in the environment can be determined, for instance, using a received first signal. The received first signal can include a GPS signal 226 and/or a wireless signal 224. For instance, the zone can be determined using position data (e.g., associated with a GPS signal 226) and/or wireless location estimation using wireless signals 224. Based on the identified zone, the map of the zone (e.g., map/constraints 230) can be retrieved and the constraints of the zone can be determined using the map. The spatial probability distribution can be identified using the constraints of the zone.

The spatial probability distribution can be revised using one or more inputs. The inputs can include one or more received second signals and/or one or more user inputs 228. The second signals received can, for instance, include a wireless signal 224 and/or a GPS signal 226. For example, as a user wearing the location device moves and/or as time passes, the location device may receive one or more GPS signals 226, one or more wireless signals 224, and/or one or more user inputs 228. In some instances, however, a GPS signal 226 may be unavailable and/or unreliable. The spatial probability distribution can be revised using available inputs to determine a cross validation model 234. Thereby, the cross validation model 234 can be dynamically revised (e.g., adjusted) based upon available inputs.

In various embodiments, the cross validation model 234 can be used to estimate reference point updates 242. For instance, an output of the cross validation model 234 can include reference point updates 242. Reference point updates 242, as used herein, can include absolute current position estimates. For example, the reference point updates can be estimated by combining location estimation techniques, with the exception of dead reckoning principles, using the cross validation model 234 (e.g., GPS techniques using one or more GPS signals 226, wireless location estimation, such as wireless signal triangulation using one or more wireless signal 224, and/or user inputs 228).

The motion model 232 can be determined using measurements from an IMU 222. The measurements can include velocity, orientation, and/or gravitational forces, among other measurements. The motion model 232, in some embodiments, can be used to estimate a movement of the location device. A movement of the location device can include movement from a first location to a second location and/or perceived movement from a first location to a second location (e.g., location 246). The estimated movement can include estimates of a change in distance 236, orientation 238, and/or height 240, for instance. The estimated movement can be calculated, for example, using dead reckoning principles.

Dead reckoning principles can include a process of calculating a current position (e.g., second location) using a previously determined location (e.g., the first location) and advancing the determined location based upon the measurements from the IMU (e.g., IMU measurements 222).

In various embodiments of the present disclosure, a user wearing the location device may not actually move. However, the IMU measurements 222 may indicate that movement (e.g., from a first location to a second location) has occurred. This error, often referred to as drift, can be filtered out and/or accounted for using the cross validation model 234 to resolve anomalies.

For instance, the motion model 232 can be revised using the cross validation model 234 and/or inputs associated the cross validation model 224, 226, 228, 230. The cross validation model 234 can be used, for example, to filter out anomalies of the motion model 232 (e.g., anomalies of IMU measurements 222). Using the cross validation model 234 to filter anomalies can be used to resolve and/or reduce errors from a low-cost IMU based dead reckoning system (e.g., from IMU taking the IMU measurements 222). As an example, abrupt orientation changes determined using IMU measurements 222 can be revised based on the cross validation model 234.

Revising the motion model 232 using the cross validation model 234, in various embodiments, can include revising the motion model 232 using user inputs 228. User inputs 228 can include speech-based descriptions and/or check-in points. As an example, the motion model 232 can be revised based on a speech-based description from a user indicating that the user has turned a 90 degree corner.

By validating the motion model 232 using the cross validation model 234, the location device can be accurate at a low-cost compared to previous approaches. For instance, the IMU component can include low-cost sub-components (e.g., as compared to previous accurate devices) and the inaccuracies of the low-cost sub-components can be resolved and/or reduced using the cross validation model 234 including user inputs 228 and map/constraints 230.

The fusion model 244 can be determined using the outputs of the motion model 232 and the cross validation model 234. For instance, the fusion model 244 can be determined using the estimated movement (e.g., distance 236, orientation 238, and/or height 240) and reference point updates 242. The fusion model 244 can be used to identify the second location (e.g., location 246) of the location device, for instance.

The second location (e.g., location 246) can be identified, for instance, by using a Kalman filter. A Kalman filter, as used herein, can include a function (e.g., an algorithm) that operates recursively on streams of noisy data (e.g., random variations) to produce a statistic estimate of the underlying system state. For instance, the function, sometimes referred to as linear quadratic estimation, can use a series of measurements observed over time containing noise and/or other inaccuracies, and produce estimates of unknown variables. Using a Kalman filter can be more accurate than using a single measurement alone.

The Kalman filter can produce estimates of the current state variables, along with their uncertainties. Once the outcome of the next measurement (necessarily corrupted with some amount of error, including random noise) is observed, these estimates can be updated using a weighted average, with more weight being given to estimates with higher certainly. Because of the function's reclusive nature, it can run in real time using only the present input measurements and the previously calculated state (e.g., may not use addition past information).

In various embodiments of the present disclosure, the second location (e.g., location 246) can be provided to the user via a user-interface component of the location device. For instance, the display can include a 3D location estimation of the second location (e.g., location 246) of the location device.

In some embodiments, the user inputs 228 can be used to determine a movement of the location device. For instance, the user inputs 228 can be associated with movement to and/or the second location (e.g., location 246). In such an instance, the user inputs 228 can be used to calculate the movement (e.g., calculate the path to the second location).

Figure 3:
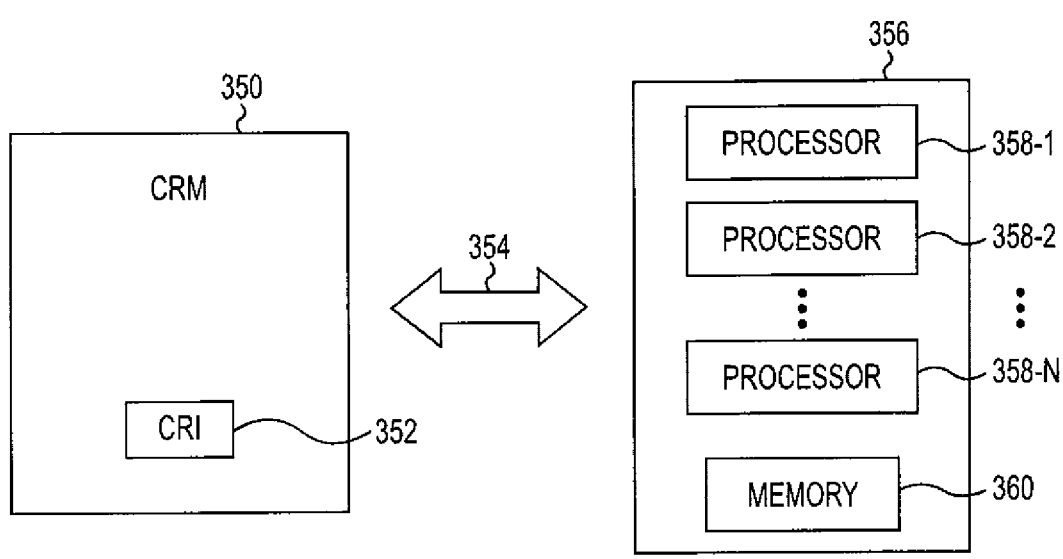
FIG. 3 illustrates a block diagram of an example of a system in accordance with one or more embodiments of the present disclosure.

FIG. 3 illustrates a block diagram of an example of a system in accordance with one or more embodiments of the present disclosure. As shown in the embodiment of FIG. 3, the system includes a computer-readable medium (CRM) 350 in communication with processing resources 358-1, 358-2 . . . 358-N.

CRM 350 can be in communication with a device 356 (e.g., a Java® application server, a location device, among others) having processing resources 358-1, 358-2 . . . 358-N. The device 356 can be in communication with a tangible non-transitory CRM 350 storing a set of computer-readable instructions (CRI) 352 executable by one or more of the processing resources 358-1, 358-2 . . . 358-N, as described herein. The CRI 352 can also be stored in remote memory managed by a server and represent an installation package that can be downloaded, installed, and executed. The device 356 can include the memory resource 360, and the processing resources 358-1, 358-2 . . . 358-N can be coupled to the memory resource 360.

Processing resources 358-1, 358-2 . . . 358-N can execute CRI 352 that can be stored on an internal or external non-transitory CRM 350. The processing resources 358-1, 358-2 . . . 358-N can execute CRI 352 to perform various functions. For example, the processing resources 358-1, 358-2 . . . 358-N can execute CRI 352 to determine a second location of the location device. A non-transitory CRM (e.g., CRM 350), as used herein, can include volatile and/or non-volatile memory. Volatile memory can include memory that depends upon power to store information, such as various types of dynamic random access memory (DRAM), among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory such as a hard disk, tape drives, floppy disk, and/or tape memory, optical discs, digital versatile discs (DVD), Blu-ray discs (BD), compact discs (CD), and/or a solid state drive (SSD), etc., as well as other types of computer-readable media.

The non-transitory CRM 350 can also include distributed storage media. For example, the CRM 350 can be distributed among various locations.

The non-transitory CRM 350 can be integral, or communicatively coupled, to a computing device, in a wired and/or a wireless manner. For example, the non-transitory CRM 350 can be an internal memory, a portable memory, a portable disk, or a memory associated with another computing resource (e.g., enabling CRIs to be transferred and/or executed across a network such as the Internet).

The CRM 350 can be in communication with the processing resources 358-1, 358-2 . . . 358-N via a communication path 354. The communication path 354 can be local or remote to a machine (e.g., a computer) associated with the processing resources 358-1, 358-2 . . . 358-N. Examples of a local communication path 354 can include an electronic bus internal to a machine (e.g., a computer) where the CRM 350 is one of volatile, non-volatile, fixed, and/or removable storage medium in communication with the processing resources 358-1, 358-2 . . . 358-N via the electronic bus. Examples of such electronic buses can include Industry Standard Architecture (ISA), Peripheral Component Interconnect (PCI), Advanced Technology Attachment (ATA), Small Computer System Interface (SCSI), Universal Serial Bus (USB), among other types of electronic buses and variants thereof.

The communication path 354 can be such that the CRM 350 is remote from the processing resources e.g., 358-1, 358-2 . . . 358-N such as in a network relationship between the CRM 350 and the processing resources (e.g., 358-1, 358-2 . . . 358-N). That is, the communication path 354 can be a network relationship. Examples of such a network relationship can include a local area network (LAN), wide area network (WAN), personal area network (PAN), and the Internet, among others. In such examples, the CRM 350 can be associated with a first computing device and the processing resources 358-1, 358-2 . . . 358-N can be associated with a second computing device (e.g., a Java® server, the location device, etc.). For example, a processing resource 358-1, 358-2 . . . 358-N can be in communication with a CRM 350, wherein the CRM 350 includes a set of instructions and wherein the processing resource 358-1, 358-2 . . . 358-N is designed to carry out the set of instructions to determine a second location of a location device.

The processing resources 358-1, 358-2 . . . 358-N coupled to the memory resource 360 can identify a spatial probability distribution using one or more constraints of a first location of a location device and a received first signal. In various embodiments, the spatial probability distribution can include a 3D spatial probability distribution for a second position based on the first position (e.g., probability of a next position based on a previously determined position).

In some embodiments, the processing resources 358-1, 358-2 . . . 358-N coupled to the memory resource 360 can determine one or more constraints of the first location (e.g., a zone of an environment that the location device is in) of the location device using a received first signal. The one or more constraints can be determined, for instance, based on a map of the first location. The map can, for instance, be retrieved based on the determination of a zone of an environment (e.g., a zone the first location is located in and/or the first location can include a zone of an environment). The retrieved map can be used, for instance, to determine constraints of the zone (e.g., movement constraints) using a floor plan of the zone.

In various embodiments, the zone can be determined. For instance, the zone in an environment that the location device is in can be determined based on the first signal. The first signal, as used herein, can include a GPS and/or other global navigation signal and/or a wireless signal. The zone can be determined, for instance, based on position data in a GPS signal and/or from location estimation performed using one or more received wireless signals (e.g., calculate wireless signal triangulation using wireless signals).

The processing resources 358-1, 358-2 . . . 358-N coupled to the memory resource 360 can revise the spatial probability distribution using a received second signal and a user input to determine a cross validation model. The second signal, as used herein, can include one or more GPS signals and/or one or more wireless signals.

In various embodiments, the spatial probability distribution can be dynamically revised using available inputs (e.g., GPS signals, wireless signals, and/or user inputs). For instance, determining the cross validation model can include dynamically determining the cross validation model based on received inputs (e.g., user inputs, GPS signals, and/or wireless signals).

The processing resources 358-1, 358-2 . . . 358-N coupled to the memory resource 360 can determine a motion model using measurements from an IMU component. For instance, the measurements can be from an accelerometer subcomponent, a gyroscope subcomponent, and/or pressure sensor subcomponent of an IMU component of the location device.

The processing resources 358-1, 358-2 . . . 358-N coupled to the memory resource 360 can revise the motion model using the cross validation model. The revision of the motion model can include filtering anomalies of the motion model. In some instance, the motion model can be revised using one or more user inputs.

The processing resources 358-1, 358-2 . . . 358-N coupled to the memory resource 360 can estimate a movement of the location device using the revised motion model. For instance, the estimated movement can include a change in distance, orientation, and/or height. The estimate can be based on dead reckoning principles applied to IMU measurements.

The processing resources 358-1, 358-2 . . . 358-N coupled to the memory resource 360 can determine the second location of the location device using the estimated movement. In various embodiments, second location can be determined by determining a fusion model using reference point updates (e.g., from the cross validation model) and the estimated movement (e.g., from the revised motion model) to identify the second location. The second location, in various examples, can include a next location and/or current location of the location device. In such instances, the first location can include a previous location, previously determined location, and/or a "fix". For instance, identifying the second location of the location device can include searching the map to obtain the second location (e.g., current location) using the user input and a previous estimate of movement.

In some embodiments of the present disclosure, the processing resources 358-1, 358-2 . . . 358-N coupled to the memory resource 360 can estimate reference point updates using the cross validation model to form absolute current position estimates. For instance, the estimate can include a combination of location estimation means, besides dead reckoning, using the cross validation model to form absolute current position estimations.

As used herein, "logic" is an alternative or additional processing resource to execute the actions and/or functions, etc., described herein, which includes hardware (e.g., various forms of transistor logic, application specific integrated circuits (ASICs), etc.), as opposed to computer executable instructions (e.g., software, firmware, etc.) stored in memory and executable by a processor.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A method for determining a location of a user assisted location device, the method comprising:
    utilizing a non-transitory computing component to perform the method including:
        determining a zone in an environment that a location device is in using position data and wireless location estimation, wherein the position data is from a Global Positioning System (GPS) component for sending and receiving GPS signals, including position data and wherein the wireless location estimation is from a wireless component for sending and receiving wireless signals;
        retrieving a map of the determined zone;
        determining constraints of the zone using the map to identify a spatial probability distribution;
        revising the spatial probability distribution using a user input, GPS signals, and wireless signals to determine a cross validation model;
        determine a motion model using measurements from an inertial measurement unit (IMU) component for tracking movement measurements, and the user input is from a user-interface component;
        revise the motion model using the cross validation model to filter anomalies;
        estimate a movement of the location device using the revised motion model based on dead reckoning principles;
        estimate reference point updates using the cross validation model; and
        determine a fusion model using the reference point updates and the estimated movement to identify a current location of the location device.

2. The method of claim 1, including identifying a spatial probability distribution of the second location using a received signal and a constraint of the first location.

3. The method of claim 1, including determining the cross validation model by revising a spatial probability distribution of the second location using a received signal.

4. The method of claim 1, wherein determining the second location includes determining a motion model using measurements from an inertial measurement unit (IMU) component.

5. The method of claim 1, wherein estimating the movement of the device includes estimating a distance, orientation, and height change using dead reckoning principles.

6. The method of claim 1, including estimating reference point updates using the cross validation model to form absolute current position estimates.

7. The method of claim 1, wherein determining the cross validation model includes receiving the user input, wherein the user input is a speech-based description.

8. The method of claim 1, wherein determining the cross validation model includes receiving the user input, wherein the user input is associated with movement.

9. A user assisted location device system, comprising:
    a non-transitory memory resource; and
    a processing resource coupled to the memory resource, wherein the processing resource is configured to execute executable instructions stored in the memory resource to:
        determine a zone in an environment that a location device is in using position data and wireless location estimation, wherein the position data is from a Global Positioning System (GPS) component for sending and receiving GPS signals, including position data and wherein the wireless location estimation is from a wireless component for sending and receiving wireless signals;
        retrieve a map of the determined zone;
        determine constraints of the zone using the map to identify a spatial probability distribution;
        revise the spatial probability distribution using a user input, GPS signals, and wireless signals to determine a cross validation model;
        determine a motion model using measurements from an inertial measurement unit (IMU) component for tracking movement measurements, and the user input is from a user-interface component;
        revise the motion model using the cross validation model to filter anomalies;
        estimate a movement of the location device using the revised motion model based on dead reckoning principles;
        estimate reference point updates using the cross validation model; and
        determine a fusion model using the reference point updates and the estimated movement to identify a current location of the location device.

10. The system of claim 9, wherein the first signal includes at least one of a global navigation signal and a wireless signal.

11. The system of claim 9, wherein the user input associated with the movement includes a user check-in at a check-in location.

12. The system of claim 11, wherein the user check-in location includes a scan check-in point.

13. The system of claim 11, wherein the user check-in includes a speech-based check-in that indicates the check-in location.

14. The system of claim 9, wherein the user input associated with the movement includes a speech-based description of movement.

15. The system of claim 9, wherein the speech-based description of movement includes at least one of a type of motion, a direction, and a lack of direction.

16. The system of claim 9, wherein the processing resource is designed to further carry out the set of instructions to search a map to obtain a current location using the user input and a previous estimate of movement.

17. A user assisted location device, comprising:
a Global Positioning System (GPS) component for sending and receiving GPS signals, including position data;
a wireless component for sending and receiving wireless signals to perform wireless location estimation;
an inertial measurement unit (IMU) component for tracking movement measurements;
a user-interface component for receiving user inputs; and
a computing component operable to:
determine a zone in an environment that a location device is in using position data and wireless location estimation;
retrieve a map of the determined zone;
determine constraints of the zone using the map to identify a spatial probability distribution;
revise the spatial probability distribution using user inputs, GPS signals, and wireless signals to determine a cross validation model;
determine a motion model using the measurements from the IMU component;
revise the motion model using the cross validation model to filter anomalies;
estimate a movement of the location device using the revised motion model based on dead reckoning principles;
estimate reference point updates using the cross validation model; and
determine a fusion model using the reference point updates and the estimated movement to identify a current location of the location device.

18. The device of claim 17, wherein the computing component is further operable to calculate wireless signal triangulation to determine the first location, wherein the first location includes a zone of a building.

19. The device of claim 17, wherein the computing component operable to determine the constraints is operable to calculate the constraints of the zone using the map of the zone.

20. The device of claim 19, wherein the constraints include movement limitations based on a floor plan of the zone.

* * * * *